Figure 1:
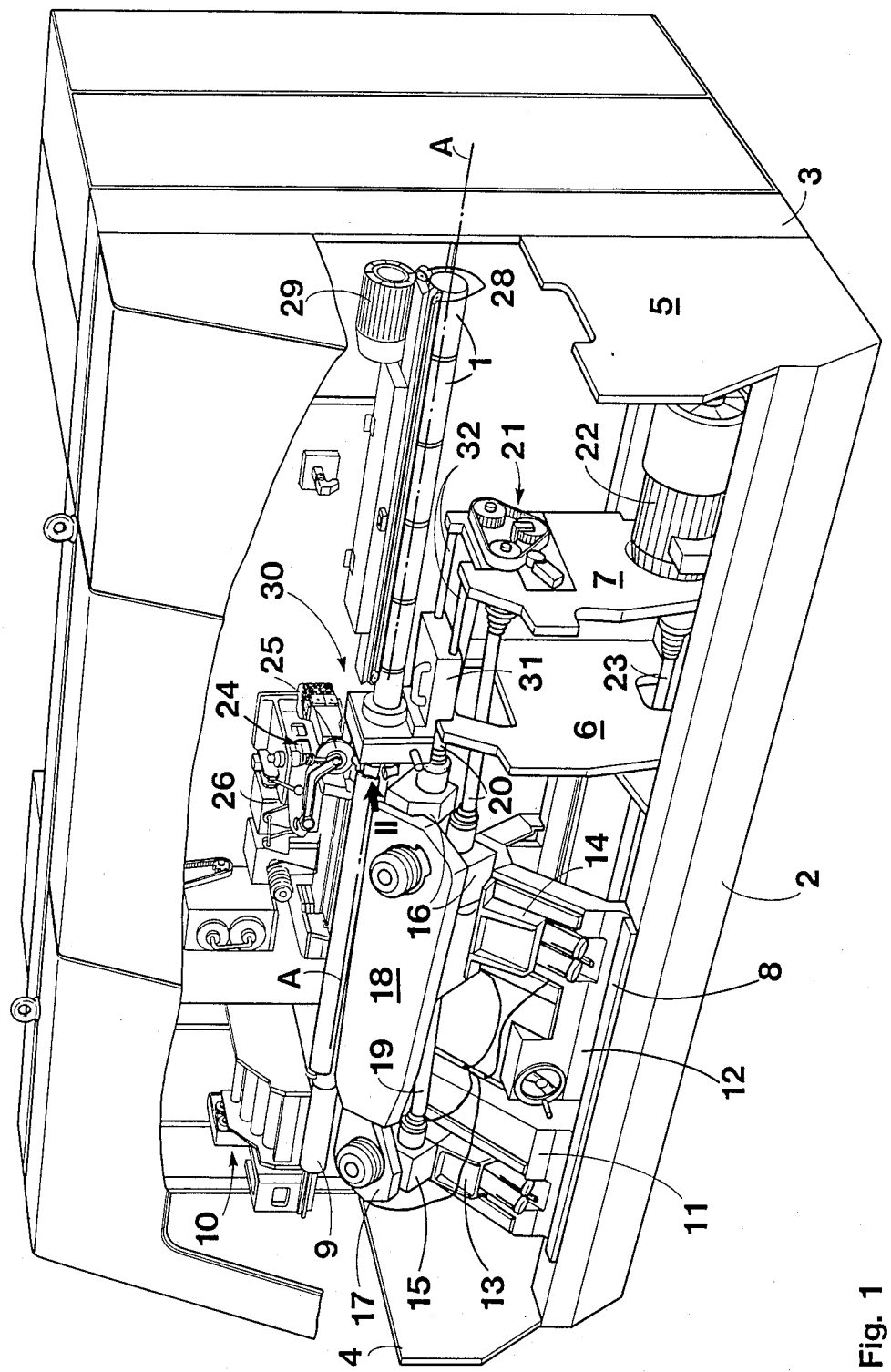

United States Patent [19]

Meier

[11] Patent Number: 4,865,243

[45] Date of Patent: Sep. 12, 1989

[54] SIZING TOOL FOR A MACHINE FOR THE LONGITUDINAL SEAM WELDING OF ROUNDED CAN BODIES

[75] Inventor: Paul Meier, Widen, Switzerland

[73] Assignee: Elpatronic, AG, Zug, Switzerland

[21] Appl. No.: 181,923

[22] Filed: Apr. 15, 1988

[30] Foreign Application Priority Data

May 8, 1987 [CH] Switzerland ............... 01765/87

[51] Int. Cl.$^4$ .................. B23K 9/22; B23K 37/00
[52] U.S. Cl. ........................... 228/15.1; 228/17; 228/17.5; 72/224
[58] Field of Search ............... 228/15.1, 17, 17.5; 72/224; 413/72, 74, 75, 76

[56] References Cited

U.S. PATENT DOCUMENTS

| | | | |
|---|---|---|---|
| 4,070,887 | 1/1978 | Hankin | 228/17.5 |
| 4,182,147 | 1/1980 | Bauer | 72/224 |
| 4,299,108 | 11/1981 | Kato | 228/17 |
| 4,377,941 | 3/1983 | Zacharias | 72/224 |
| 4,710,608 | 12/1987 | Noda | 228/15.1 |

*Primary Examiner*—Kurt Rowan

*Attorney, Agent, or Firm*—McCormick, Paulding & Huber

[57] ABSTRACT

A frame-like roller carrier (40) which defines a sizing plane (C) normal to the longitudinal axis (A) of the can bodies is arranged in relation to a welding device (24) in such a manner that the sizing plane (C) coincides at least approximately with a welding plane (B) defined by the welding device. A plurality of sizing rollers (41) are mounted on the roller carrier (40), each for rotation about a roller axis (E) lying in the sizing plane (C). The sizing rollers (41) form a rigid ring of rollers through which the can bodies (1) can be moved. The roller carrier is divided into two half-frames (40), each of which carries a plurality of sizing rollers (41). The two half-frames (40) are adjustably supported on a common bridge (31). At least one of the half-frames (40) is connected to the bridge (31) by an adjusting drive (37) for the adjustment of the sizing rollers (41) carried by it. Consequently, the sizing tool (30) can be adjusted with little labor, for example if the overlapping width of the can longitudinal edges to be welded to one another has to be altered.

4 Claims, 4 Drawing Sheets

SIZING TOOL FOR A MACHINE FOR THE LONGITUDINAL SEAM WELDING OF ROUNDED CAN BODIES

The invention relates to a sizing tool for a machine for the longitudinal seam welding of rounded can bodies having a frame-like roller carrier which defines a sizing plane normal to the longitudinal axis of the can body and which has to be disposed in such a manner, in relation to a welding device, that the sizing plane coincides at least approximately with a welding plane defined by the welding device, a plurality of sizing rollers, each of which is mounted on the roller carrier for rotation about a roller axis situated in the sizing plane and which form a rigid ring of rollers through which the can bodies can be moved and devices for adjusting the sizing rollers in the sizing plane.

The purpose of such sizing tools is forcibly to impose a shape, by its rigid ring or rollers, on the rounded can bodies which are being moved in succession through the welding plane, with which shape, the longitudinal edges of the can bodies keep precisely to a specific position in relation to one another, depending on the nature of the welding provided. If a mash seam is to be welded, for example, the longitudinal edges of the can body should overlap one another by a precisely fixed amount of the order of magnitude of 2.5 times the thickness of the sheet metal; on the other hand, if a butt-seam is to be welded, it is crucial that the cut edges at the longitudinal edges of the can body should bear against one another with a specific pressure. In any case, the rigid ring of rollers of the sizing tool—and not, for example, a possibly sprung guide device disposed upstream of this rigid ring of rollers in the conveying direction—is responsible for the precise positioning of the longitudinal edges of the can bodies within the working range of the welding device. Therefore, the rigid ring of rollers of the sizing tool also has a decisive influence on the quality of the resulting welding seam and of the welded can bodies as a whole.

In known sizing tools of the said type (see, for example operating instructions of Soudronic AG, CH-8962 Bergdietikon, for can welding machines of the type FBB 337/A) the roller carrier is a self-contained rigid frame on which the sizing rollers are mounted, each on an eccentric pin. The sizing rollers can be adjusted by turning the eccentric pin, in such a manner that a sizing tool provided for can bodies of a specific nominal diameter can be adapted, within certain limits, to different thicknesses of sheet metal and overlapping widths of the can bodies. As an aid for the adjustment of the sizing rollers, a separate, accurately ground adjusting mandrel is necessary for each thickness of sheet metal and overlapping width, the diameter of which mandrel corresponds to the diameter of the can bodies to be produced. By turning their eccentric pins, the individual sizing rollers are brought into a position in which they bear without clearance against the adjusting mandrel arranged accurately centrally. Then the eccentric pins are wedged in position so that they can no longer be adjusted. If it is then found, during the first welding experiments, that the longitudinal edges of the can bodies do not precisely assume the prescribed position in relation to one another, for example that they overlap too much, then either the whole time-consuming adjusting procedure must be repeated with all the sizing rollers, using a correspondingly altered adjusting mandrel or, for the sake of simplicity, an attempt is made to readjust individual sizing rollers only. The latter, however, generally has the consequence, particularly if particularly thin can sheet has to be processed, that longitudinal markings are formed on the can bodies because individual sizing rollers have been adjusted impermissibly far radially inwards in relation to the other sizing rollers in the rigid ring of rollers.

It is therefore the object of the invention to develop further a sizing tool for a machine for the longitudinal seam welding of rounded can bodies, in such a manner that the rigid ring of rollers can be adapted with less labour than hitherto to different thicknesses of sheet metal and seam formations of the can bodies.

Starting from a sizing tool of the type described at the beginning, the problem is solved, according to the invention, in that the roller carrier is divided into two half-frames, each of which carries a plurality of sizing rollers, at least one of the two half-frames are adjustably supported on a common bridge, at least one of the half-frames is connected to the bridge by an adjusting drive for the adjustment of the sizing rollers carried thereby.

In the sizing tool according to the invention, the sizing rollers on each of the two half-frames can be adjusted once and for all so that they describe a portion of an arc, preferably a semicircle. In a specific desired position of the two half-frames in relation to one another, the sizing rollers mounted thereon describe, as a whole, a precise circle, the diameter of which coincides with the desired external diameter of the can bodies to be welded.

If it is now found that the longitudinal edges of the can bodies which are to be welded together do not lie precisely on or against one another in the prescribed manner, the necessary correction can be carried out simply in that at least one of the two half-frames is adjusted in relation to the bridge by means of the adjusting drive associated therewith. The arcs, preferably semicircles, which are described by the sizing rollers on each of the two half-frames are not altered by this adjustment. It is true that all the sizing rollers as a whole on the two half-frames now no longer describe a precise circle but an oval or a similar formation. It has been found, however, that such a deviation from the precise circular shape remains without any harmful influence on the appearance of the welded can bodies if the adjustment of the half-frames in relation to one another does not exceed the order of magnitude of about 0.5 to 2 mm depending on the nominal diameter of the can bodies.

Such a range of adjustment is sufficient for one and the same pair of half-frames with sizing rollers having a fixed setting to be used for all the cans having one and the same nominal diameter, regardless of whether and possibly of the extent to which the longitudinal edges of the can bodies should overlap during the welding, and furthermore regardless of whether a thicker or thinner and hence a stiffer or less stiff sheet metal, within the usual limits, is used for the can bodies. Accordingly, for the production of cans of a specific nominal diameter, only a single adjusting mandrel is necessary, by means of which the sizing rollers on the half-frames are adjusted once and for all.

The sizing tool according to the invention is preferably further developed in that two guides in alignment with one another are formed on the bridge, on each of which guides a cross slide is guided and can be rigidly clamped, and the two half-frames are each interchangeably secured to one of the cross slides.

Thus the effect is achieved that, in order to produce can bodies of different nominal diameters, the sizing tool as a whole no longer has to be exchanged as hitherto, but only the pair of half-frames with sizing rollers rigidly mounted thereon and adapted to the nominal diameter of the cans to be produced. Each of the two half-frames with associated sizing rollers has a very much lower weight than a known sizing tool provided for can bodies of the same nominal diameter. As a result, the adaptation to can bodies of different nominal diameters is considerably facilitated.

In the further development of the invention described above, it is further an advantage that a plurality of sizing rollers are disposed symmetrically in relation to a diametral plane containing the longitudinal axis of the can bodies and normal to the sizing plane, on each of the two half-frames, and the guides extend parallel to this diametral plane.

An adjusting drive with a threaded spindle is preferably associated with each of the two half-frames.

An auxiliary member, on which at least one presizing roller is mounted, may be secured to each of the two half-frames.

Finally, it is an advantage if the bridge is guided on a machine bed for adjustment parallel to the longitudinal axis of the can bodies.

One example of embodiment of the invention is described below with reference to diagrammatic drawings, with further details.

Figure 2:
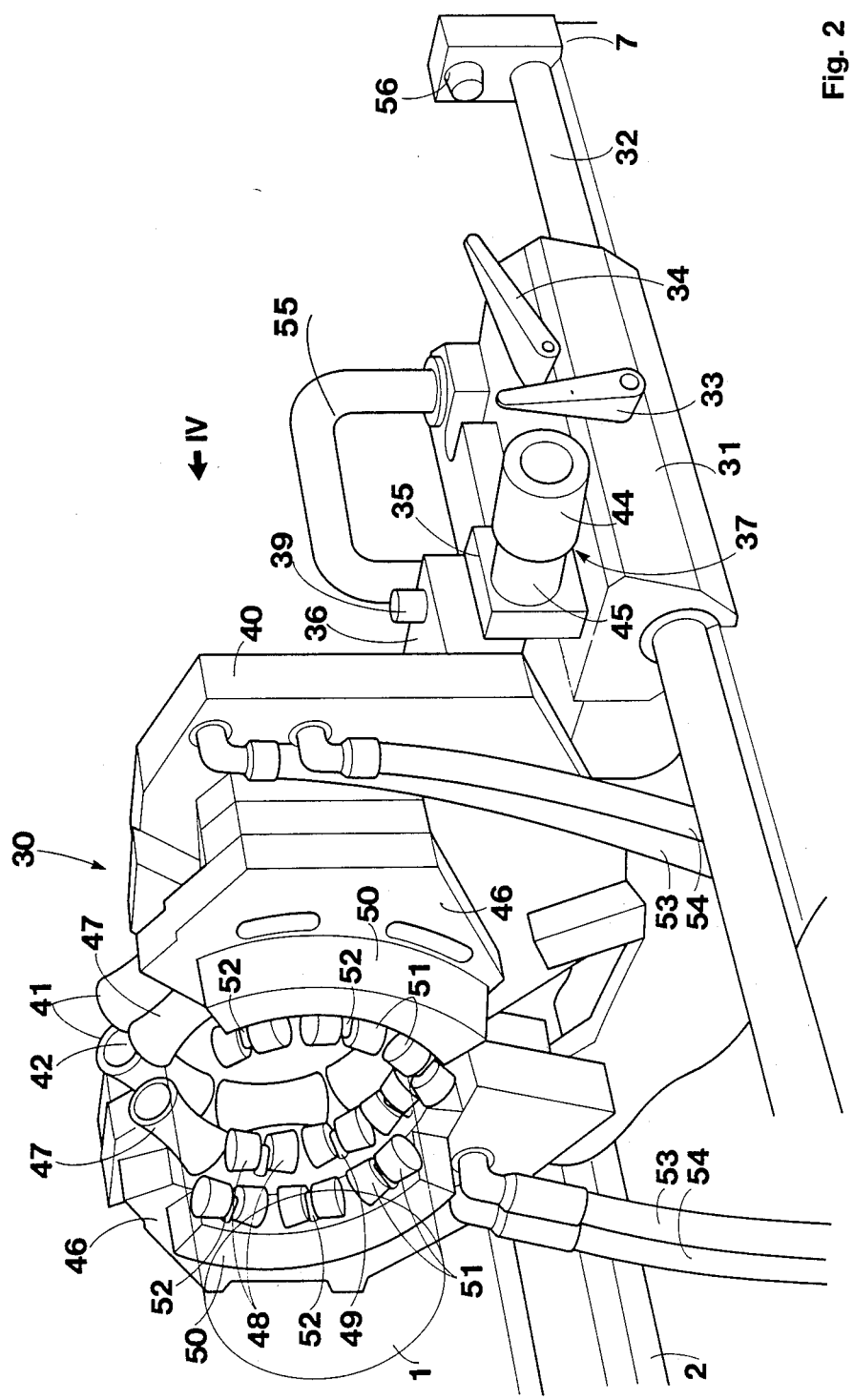
Figure 3:
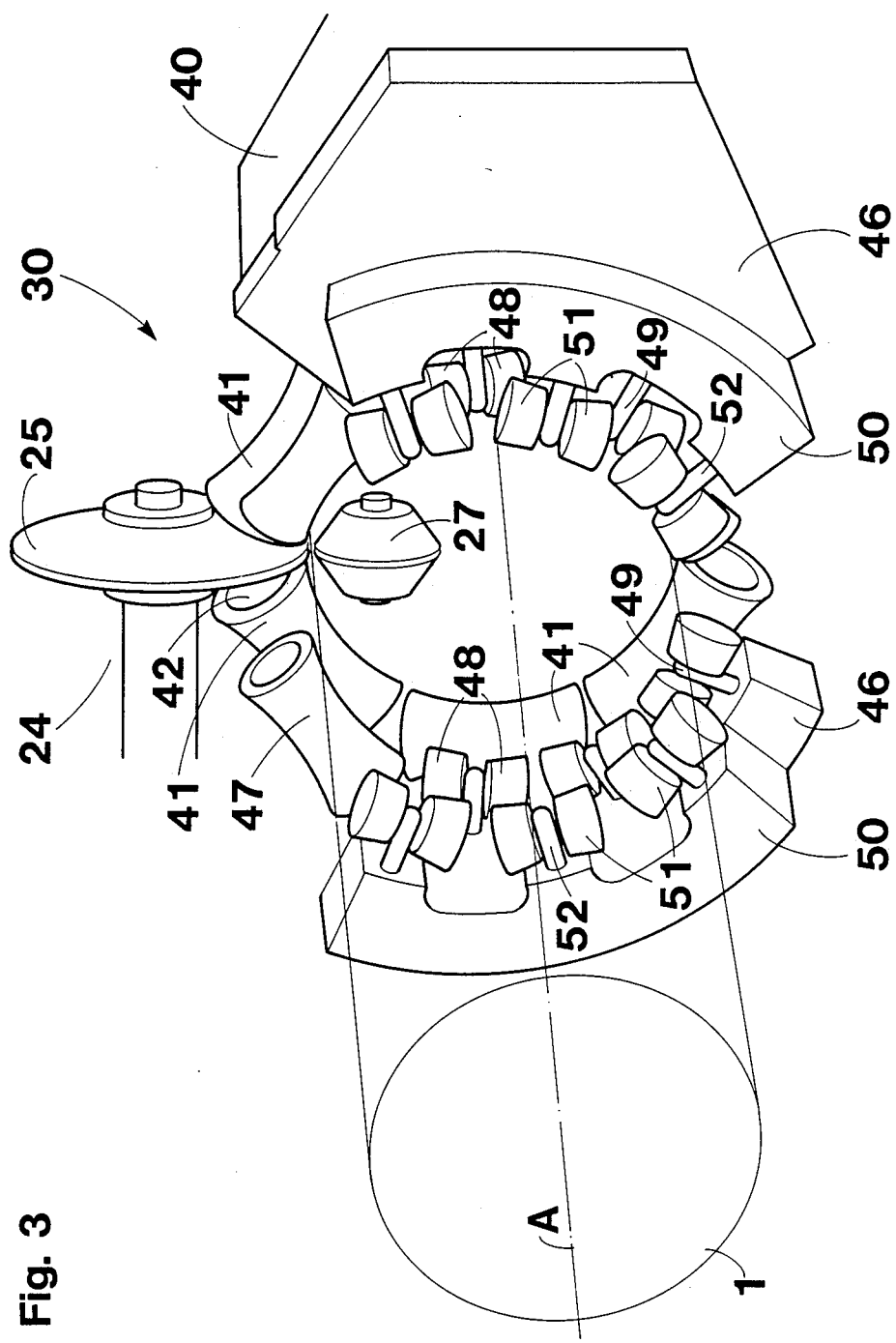
Figure 4:
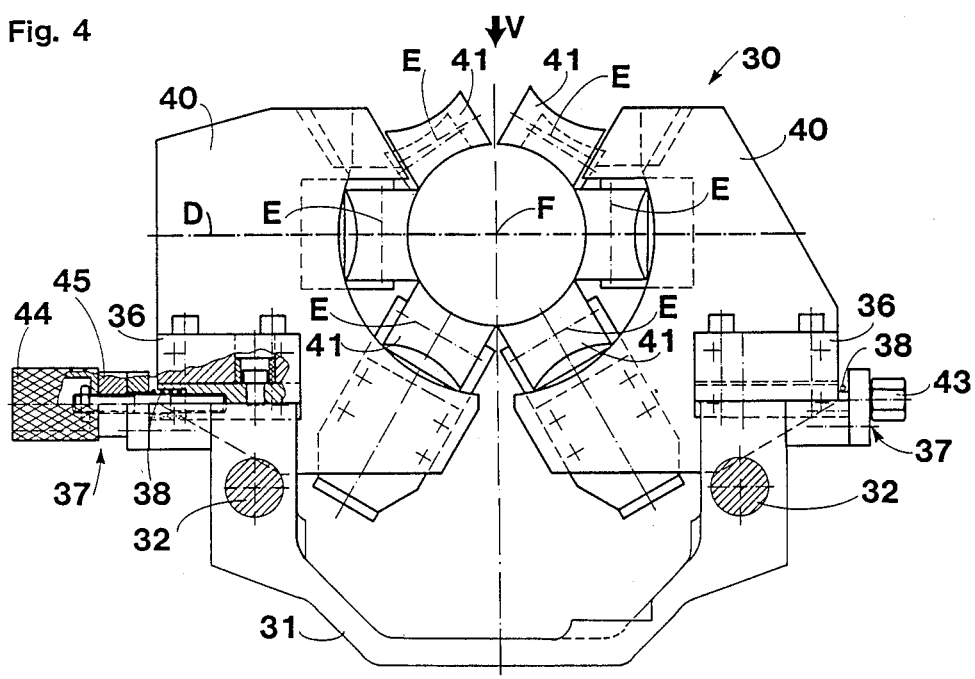
Figure 5:
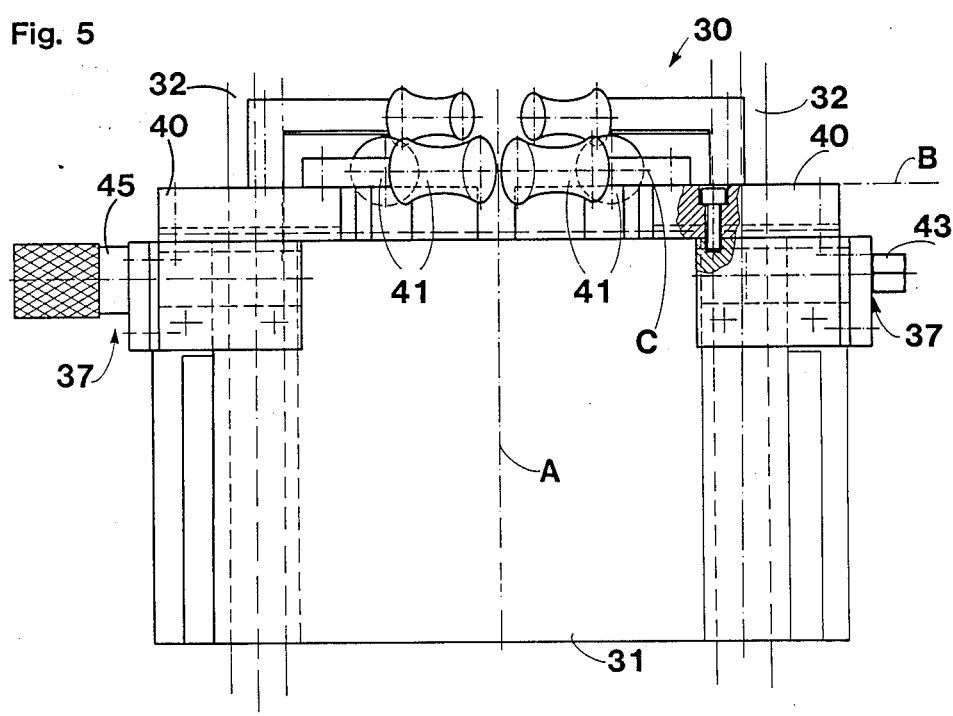

FIG. 1 shows an oblique view of a machine for the longitudinal seam welding of rounded can bodies, FIG. 2 shows an enlarged partial view in the direction of the arrow II in FIG. 1, FIG. 3 shows a further enlarged partial view with a similar direction of viewing as in FIG. 2, FIG. 4 shows a partial side view in the direction of the arrow IV in FIG. 2, and FIG. 5 shows a partial plan view in the direction of the arrow V in FIG. 4.

The machine illustrated serves the purpose of rolling can bodies 1 from plane, rectangular sheet-metal blanks and welding their longitudinal edges to one another. Supporting parts of the machine are an elongated machine bed 2 and a likewise elongated vertical frame 3 secured thereto. The machine bed 2 has a rear end wall 4 and a front end wall 5 as well as a rear intermediate wall 6 and a front intermediate wall 7, parallel thereto. Longitudinally directed guides 8 are formed on the machine bed 2 between the rear end wall 4 and the rear intermediate wall 6. Disposed above the guides 8 and parallel thereto is an arm 9 which is secured, in the region of its rear end, at the left in FIG. 1, to the frame 3 and extends from there in the direction of a horizontal axis which is designated hereinafter as the longitudinal axis A of the can bodies.

Disposed near the rear end of the arm 9 is a rounding device 10 of conventional construction which, during each working cycle of the machine, rounds a can body 1 about the arm. Below the arm 9, a rear frame 11 and a front frame 12 are disposed on the guides 8 for adjustment parallel to the longitudinal axis A of the can bodies. Each of the two frames 11 and 12 has the shape of a gable roof which covers a portion of the machine bed 2 and carries a pair of sliding carriages 13 and 14 which are adjustable radially in relation to the longitudinal axis A of the can bodies. Each of the total of four sliding carriages 13 and 14 comprises a gear unit 15 or 16 respectively to which a conveyor device 17 or 18 respectively is interchangeably secured. Each pair of conveyor devices 17 or 18 is disposed symmetrically to a vertical plane which contains the longitudinal axis A of the can bodies.

The purpose of the two conveyor devices 17 is to convey jointly, during each working cycle of the machine, a rounded can body 1 away from the rounding device 10 forwards in the direction of the longitudinal axis A of the can bodies, that is to say to the right in FIG. 1, and to transfer it to the two conveyor devices 18 which then convey the can body further forwards in a continuous movement.

The two conveyor devices 17 are each driven by a cardan shaft 19 which connects the associated gear unit 15 to the adjacent gear unit 16. Each of the two gear units 16 is connected, by a further cardan shaft 20, to a branching gear transmission 21 which is disposed on the front end wall 5 and can be driven by a motor 22. The rounding device 10 can also be driven by the same motor 22 through a further cardan shaft 23 so that this rounding device is synchronised with the conveyor devices 17.

Disposed at a short distance in front of the two conveyor devices 18 is a welding device 24; this includes an upper electrode roller 25 which is mounted on a lever 26 and a lower electrode roller 27 which is mounted on the arm 9. The axes of the two electrode rollers 25 and 27 lie at least substantially in a common vertical plane which extends at 10 right angles to the longitudinal axis A of the can bodies and is designated hereinafter as the welding plane B. Guided over the electrode rollers 25 and 27 in the usual manner is an electrode wire which is driven and entrains each individual can body 1 brought up by the conveyor devices 18 and moves it through a sizing tool 30.

The sizing tool 30 has a bridge 31 which is adjustable on a pair of guide bars 32 and can be clamped by means of a clamping lever 33. The two guide bars 32 extend parallel to the longitudinal axis A of the can bodies and connect the two intermediate walls 6 and 7 to one another. Disposed on the bridge 31, adjustable in height and locatable by means of a further clamping lever 34, is a pair of horizontal guides 35 which extend at right angles to the longitudinal axis A of the can bodies, that is to say at least substantially parallel to the axes of rotation of the electrode rollers 25 and 27, and are in alignment with one another.

A cross slide 36 is guided on each of the two guides 35 and is adjustable by means of an adjusting drive 37. In the example illustrated, the two adjusting drives 37 are separate threaded spindles so that each of the two cross slides 36 is adjustable independently of the other on the associated guide 35. As an alternative to the design illustrated, the two adjusting drives 37 may be formed by a right-handed and a left-handed threaded portion of one and the same threaded spindle so that the two cross slides 36 are always adjustable jointly and by the same amounts but in opposite directions.

In any case, care is taken to ensure that the adjustment of the cross slide 36 remains independent of the backlash of the threads; for this purpose, in the example of embodiment illustrated, a preloaded spring 38 is associated with each of the adjusting drives 37. Independently of the fact that each of the two cross slides 36 is thus already held in a specific position through its adjusting drive, each of the two cross slides 36 can be clamped in any selected position on the associated guide 35 by means of a clamping screw 39 in such a manner that it forms a rigid unit with the bridge 31.

A half-frame 40 is rigidly but interchangeably secured to each of the two cross slides 36. The two half-frames 40 jointly define a sizing plane C which is normal to the longitudinal axis A of the can bodies that is to say vertical and parallel to the guides 35. Three sizing rollers 41 are each mounted on a journal pin 42, symmetrically in relation to a horizontal diametral plane D containing the longitudinal axis A of the can bodies, on each of the two half-frames 40. All the journal pins 42 are arranged in such a manner that the roller axes E of the sizing rollers 41, which axes are determined by them, lie in the sizing plane C. The bridge 31 is adjusted and clamped on the guide bars 32 in such a manner that the sizing plane C either coincides with the welding plane B or is disposed upstream of the welding plane B in the conveying direction, that is to say to the left in FIG. 1, by a small amount of the order of magnitude of about 0.5 to 2 mm.

The sizing rollers 41 have concave arcuate generating lines, the radius of curvature of which coincides with half the external diameter of the can bodies 1 to be welded. The generating lines of the sizing rollers 41 situated in the sizing plane C and adjacent to the longitudinal axis A of the can bodies have a common centre of curvature F on each of the two half-frames 40. The two cross slides 36 are adjusted, if possible, so that the centres of curvature F of the associated sizing rollers 41 coincide and lie on the longitudinal axis A of the can bodies.

Certain deviations of the centres of curvature F from the longitudinal axis A of the can bodies may, however, be permitted. Use is made of this if it is necessary to adapt the sizing tool 30 to peculiarities of the can bodies 1 to be produced, within the scope of a certain nominal diameter, particularly in order to ensure certain relationships in the arrangement between the longitudinal edges of the can bodies to be welded to one another.

In the example illustrated provision is made for the right-hand adjusting drive 37 in FIGS. 4 and 5 to be actuated by means of a hexagonal head 43 for a rough adjustment of the associated cross slide 36 and then to be clamped by means of the associated clamping screw 39 after which a fine adjustment is carried out at the other cross slide 36 by means of a rotary knob 44 with which a graduated ring 45 is associated in the manner of a micrometer gauge.

Devices which facilitate the entry of the can bodies 1 into the rigid ring of sizing rollers 41 may be disposed on the sizing tool 30 upstream of the sizing plane C in the conveying direction. Such devices may be connected to the half-frames 40 and be able to be exchanged jointly with these. In the example illustrated, a plate-like first auxiliary member 46 is secured to each half frame 40 on which member there are mounted presizing rollers 47 and also guide rollers 48 which are arranged in pairs, each on a bearing block 49.

Furthermore, secured to each of the two half-frames 40, upstream of the associated first auxiliary member 46 in the direction of conveying is a second auxiliary member 50 which is likewise plate-like and on which further guide rollers 51 are mounted, likewise in pairs, each on a bearing block 52. The bearing blocks 49 and 52 may be resiliently supported radially on the associated auxiliary member 46 or 50 respectively since they are not responsible for the accuracy of the sizing of the can bodies.

Flexible pipes 53 and 54 are connected to the half-frames 40 to supply and draw off cooling water in order that the half-frames may not become excessively heated despite their arrangement in or very close to the welding plane B.

Secured to the bridge 31 is a handle 55 which makes it easier to displace the whole sizing tool 30 out of its working position illustrated, downstream in the conveying direction, towards a stop 56, for example in order that the half-frames 40 may be exchanged.

I claim:

1. A sizing tool for a machine for the longitudinal seam welding of rounded can bodies having,
   a frame-like roller carrier (40) which defines a sizing plane (C) normal to the longitudinal axis (A) of the can bodies and is arranged in relation to a welding device (24) in such a manner that the sizing plane (C) at least approximately coincides with a welding plane (B) defined by the welding device (24) extending generally at a right angle to the longitudinal axis A,
   a plurality of sizing rollers (41) each of which is mounted on the roller carrier (40) for rotation about a roller axis (E) lying in the sizing plane (C) and which form a rigid ring of rollers through which the can bodies (1) can be moved, and
   devices for adjusting the sizing rollers (41) in the sizing plane (C), the sizing tool being characterized in that:
   the roller carrier is divided into two half-frames (40) each of which carries a plurality of sizing rollers (41),
   the two half-frames (40) being adjustably supported on a common bridge (31);
   at least one of the half-frames (40) being connected to the bridge (31) by an adjusting drive (37) for adjustment of the sizing rollers (41) carried by it;
   formed on the bridge (31) are two guides (35) which are in alignment with one another and on each of which a cross slide (36) is guided and can be rigidly clamped; and
   the two half-frames (40) are each interchangeably secured to one of the cross slides (36).

2. A sizing tool according to claim 1, characterized in that
   a plurality of sizing rollers (41) are disposed on each of the two half-frames (40), symmetrically in relation to a diametral plane (D) normal to the sizing plane (C) and containing the longitudinal axis (A) of the can bodies, and
   the guides (35) extend parallel to this diametral plane (D).

3. A sizing tool for a machine for the longitudinal seam welding of rounded can bodies having,
   a frame-like roller carrier (40) which defines a sizing plane (C) normal to the longitudinal axis (A) of the can bodies and is arranged in relation to a welding device (24) in such a manner that the sizing plane (C) at least approximately coincides with a welding plane (B) defined by the welding device (24) and extending generally at a right angle to the longitudinal axis A, a plurality of sizing rollers (41) each of which is mounted on the roller carrier (40) for rotation about a roller axis (E) lying in the sizing plane (C) and which form a rigid ring of rollers through which the can bodies (1) can be moved, and devices for adjusting the sizing rollers (41) in the sizing plane (c), the sizing tool being characterized in that:

the roller carrier is divided into two half-frames (40) each of which carries a plurality of sizing rollers (41), the two half-frames (40) being adjustably supported on a common bridge (31);

at least one of the half-frames (40) being connected to the bridge (31) by an adjusting drive (37) for adjustment of the sizing rollers (41) carried by it, and secured to each of the half-frames (40) is an auxiliary member (46) on which at least one presizing roller (47) is mounted.

4. A sizing tool for a machine for the longitudinal seam welding of rounded can bodies having, a frame-like roller carrier (40) which defines a sizing plane (C) normal to the longitudinal axis (A) of the can bodies and is arranged in relation to a welding device (24) in such a manner that the sizing plane (C) at least approximately coincides with a welding plane (B) defined by the welding device (24) extending generally at a right angle to the longitudinal axis A, a plurality of sizing rollers (41) each of which is mounted on the roller carrier (40) for rotation about a roller axis (E) lying in the sizing plane (C) and which form a rigid ring of rollers through which the can bodies (1) can be moved, and devices for adjusting the sizing rollers (41) in the sizing plane (C), the sizing tool being characterized in that:

the roller carrier is divided into two half-frames (40) each of which carries a plurality of sizing rollers (41);

the two half-frames (40) being adjustably supported on a common bridge (31);

at least one of the half-frames (40) being connected to the bridge (31) by an adjusting drive (37) for adjustment of the sizing rollers (41) carried by it; and wherein the bridge (31) is guided on guide bars supported on a machine bed (2) for adjustment parallel to the longitudinal axis (A) of the can bodies.

* * * * *